United States Patent [19]

Sakai

[11] Patent Number: 5,422,944
[45] Date of Patent: Jun. 6, 1995

[54] ATTENDANT CONSOLE SHARING SYSTEM AND METHOD IN CENTREX

[75] Inventor: Nobuyuki Sakai, Tokyo, Japan

[73] Assignee: NEC Corporation, Tokyo, Japan

[21] Appl. No.: 196,542

[22] Filed: Feb. 15, 1994

[30] Foreign Application Priority Data

Feb. 15, 1993 [JP] Japan .................................. 5-025784

[51] Int. Cl.$^6$ .............................................. H04M 3/56
[52] U.S. Cl. ................................... 379/260; 379/262;
379/267; 379/265; 379/266
[58] Field of Search ............... 379/232, 231, 234, 225,
379/218, 267, 265, 266, 262, 313, 314, 310, 260

[56] References Cited

U.S. PATENT DOCUMENTS 3,859,473 1/1975 Brown et al. .................. 379/225
4,951,310 8/1990 Honda et al. .................. 379/266

FOREIGN PATENT DOCUMENTS 62-239757 10/1987 Japan .

Primary Examiner—James L. Dwyer
Assistant Examiner—Scott Wolinsky
Attorney, Agent, or Firm—Foley & Lardner

[57] ABSTRACT

A centrex with an attendant console sharing system wherein there is no restriction in an extension line numbering plan so that an attendant console can accept a call to any business group and will connect the call only to the extension line station of the business group for which the call is destined. Means for connecting 12 of the centrex links attendant console 2 to business group attendant console data corresponding to the business group for which an incoming call is destined in accordance with pilot number-to-attendant console conversion table 3 when the call arrives at attendant console 2 from a public network subscriber and in accordance with business group number-to-attendant console conversion table 4 when the call arrives from an extension line station of the business group.

5 Claims, 7 Drawing Sheets

ATTENDANT CONSOLE SHARING SYSTEM AND METHOD IN CENTREX

BACKGROUND OF THE INVENTION

1. Field of the Invention

This invention relates to an attendant console sharing system in a centrex, and particularly control of an attendant console sharing system in a centrex.

More specifically, the present invention relates to improvements in operability of an attendant console and to flexibility of an extension line numbering plan for business groups in a case wherein the attendant console is shared by a plurality of business groups such as a plurality of enterprises located in the same premises for purposes of economy.

2. Description of the Related Art

FIG. 1 is a view showing an example of a conventional centrex system.

Attendant console 21c is provided for a specific business group such as business group C, and performs call connection assistance to extension line stations 81c and 82c and their counterpart in communication through central office 1A.

However, in order to reduce the economic burden of installing an attendant console, it is required to share an attendant console among centrex customers. Based on the centrex service, business groups D and E join in a group forming a centrex complex 13 and share attendant console 22. In this instance, when a call to a pilot number of one of business groups D or E arrives, the call is connected to attendant console 22, and assistance to call connection to one of extension line stations 81d to 83d in business group D or extension line stations 81e to 83e in business group E is performed by attendant console 22. In this instance, if some extension line numbers overlap among the business groups which share the attendant console, since an extension line station cannot be designated from the attendant console, an extension line number allocation condition (numbering plan) must be decided among the business groups.

In the example of FIG. 1, extension line numbers of the one hundred level such as 111, 112 and 113 are allocated to extension line stations 81d to 83d of business group D, respectively, and extension line numbers of the two hundred level such as 211, 212 and 213 are allocated to extension line subscribers 81e to 83e of business group E, respectively.

FIG. 7 is a diagrammatic view showing an example of an attendant console sharing system with a conventional private branch exchange (for example, Japanese Patent 62-239757/1987). In the second conventional system shown in FIG. 7, business groups F and G share private branch exchange 14, and business group numbers nf and ng are allocated to extension line stations such as 81f and 82f and extension line stations 81g and 82g belonging to business groups F and G, respectively. Separately, central office trunks 151f and 152f and central office trunks 151g and 152g, which interconnect private branch exchange 14 and central office 1B, have business group numbers nf and ng allocated thereto corresponding to business groups F and G to which they belong, respectively.

Attendant consoles 21 and 22 are shared by business groups F and G. Means for connecting 16, via switching unit 160, discriminates between intra-business group number nf or ng to which an incoming call from an extension line station or a tie trunk belongs and connects the call to attendant console 21 or 22. Consequently, attendant console 21 or 22 enters into the same condition as belonging exclusively to business group F or G and can perform connection assistance to the business group for which the call is destined.

The attendant console sharing system of the conventional examples described above, however, are individually disadvantageous in the following points. In particular, the first conventional system shown in FIG. 1 is disadvantageous in that a numbering plan for allocation of extension line numbers must be decided in advance so that extension line numbers do not overlap among business groups which share the attendant console, resulting in service which is inferior in flexibility and convenience to users.

Further, the first conventional system shown in FIG. 1 does not have a countermeasure against the situation that, when the attendant console accepts an incoming call to a business group and then tries to call a called extension line station and to connect the incoming call to the called extension line station, it calls a separate wrong extension line station in another business group in the same centrex complex and connects the incoming call to the thus-called extension line station in error. For example, referring to FIG. 1, when a call dialed to a pilot number of business group D arrives at attendant console 22 and connection to extension line station 81d of business group D is requested, if extension line number 111 is dialed as 211 in error, the call is connected to extension line station 81e of business group E. However, since no countermeasure against erroneous connection is taken in this instance, there is the possibility that a problem of security may arise.

The second conventional system adopted by the private branch exchange shown in FIG. 7 as another example of a conventional attendant console sharing system employs the method wherein a business group is discriminated from a trunk number since a group of tie trunks between the private branch exchange and the central office is allocated for each business group. However, in the centrex to which take present invention is directed, a call may possibly come from unspecified public network subscriber 91 or 92 or through one of tie trunks 10 which are not specified for business group F or G as shown in FIG. 2. Accordingly, a private branch exchange system cannot be adopted.

SUMMARY OF THE INVENTION

It is an object of the present invention to provide an attendant console sharing system wherein no restriction is provided to an extension line numbering plan for business groups which share an attendant console so that the attendant console can accept any call destined for any business group sharing the attendant console and can connect the call only to an extension line station belonging to the destined business group, thereby improving security among the groups.

In order to attain the object described above, an attendant console sharing system in a centrex according to the present invention is an attendant console sharing system in a centrex which comprises switching equipment in which a plurality of extension line stations which belong to a plurality of business groups other than a plurality of subscriber lines and tie trunks of a public telephone network, and an attendant console connected to the switching equipment, the switching equipment including main memory means for storing subscriber data for the extension line stations belonging to each business group and business group data holding connection attributes and numbering plans of each business group, and a central controller including controlling means for sharing the attendant console among the business groups to perform a centrex service, the sharing system of the attendant console comprising, business group attendant console data which is provided for each of the business groups and holding a connection attribute peculiar to each attendant console for the business group, means for selecting, in response to an incoming call through one of the pilot numbers to the attendant console, the business group for which the call is destined and linking the selected business group attendant console data to the attendant console, means for selecting, in response to an access call to the attendant console by dialing an access code from an extension line, the business group in which the extension line station is accommodated and linking the selected business group attendant console data to said attendant console.

The attendant console sharing system in a centrex may comprise a main memory which stores business group attendant console data provided for each of the business groups and indicates a connection attribute peculiar the attendant console for the business group, a pilot number-to-attendant console conversion table in which business group pilot numbers and address pointers to business group attendant console data are stored in a corresponding relationship, a business group number-to-attendant console conversion table in which group numbers applied to the business groups and address pointers to business group attendant console data are stored in a corresponding relationship, the controlling means including means for connecting for linking, when receiving an incoming call to the attendant console, the attendant console to the attendant console data for the business group which corresponds to the incoming call.

The attendant console sharing system may comprise, the means for connecting including means for linking, in response to an incoming call to one of the pilot numbers of the business groups from a public telephone network subscriber, the attendant console to the attendant console data corresponding to one of the business groups for which the call is destined in accordance with the content of said pilot number-to-attendant console conversion table, and means for linking, in response to an incoming call to the attendant console through dialing the attendant console access code from an extension line station in the business group, the attendant console to the attendant console data corresponding to one of the business groups for which the call is destined in accordance with the content of said business group number-to-attendant console conversion table.

Other and further objects of this invention will become obvious upon understanding the illustrative embodiments described or indicated in the appended claims, and various advantages not referred to herein will occur to one skilled in the art upon employment of the invention in practice.

DESCRIPTION OF THE PREFERRED EMBODIMENT

An embodiment of the present invention is described with reference to the drawings.

Figure 1:
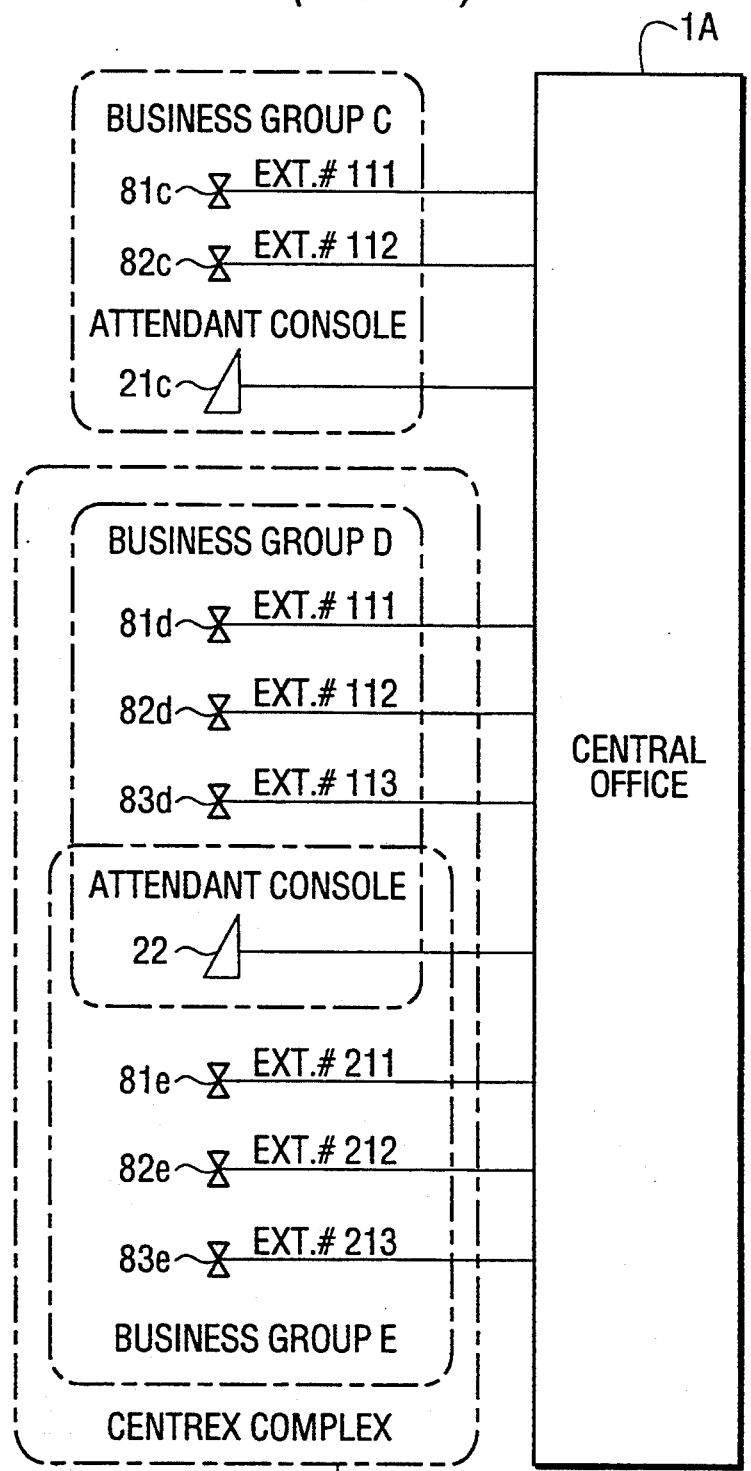
FIG. 1 is a diagrammatic view showing an example of a centrex with a first conventional attendant console sharing system.
Figure 2:
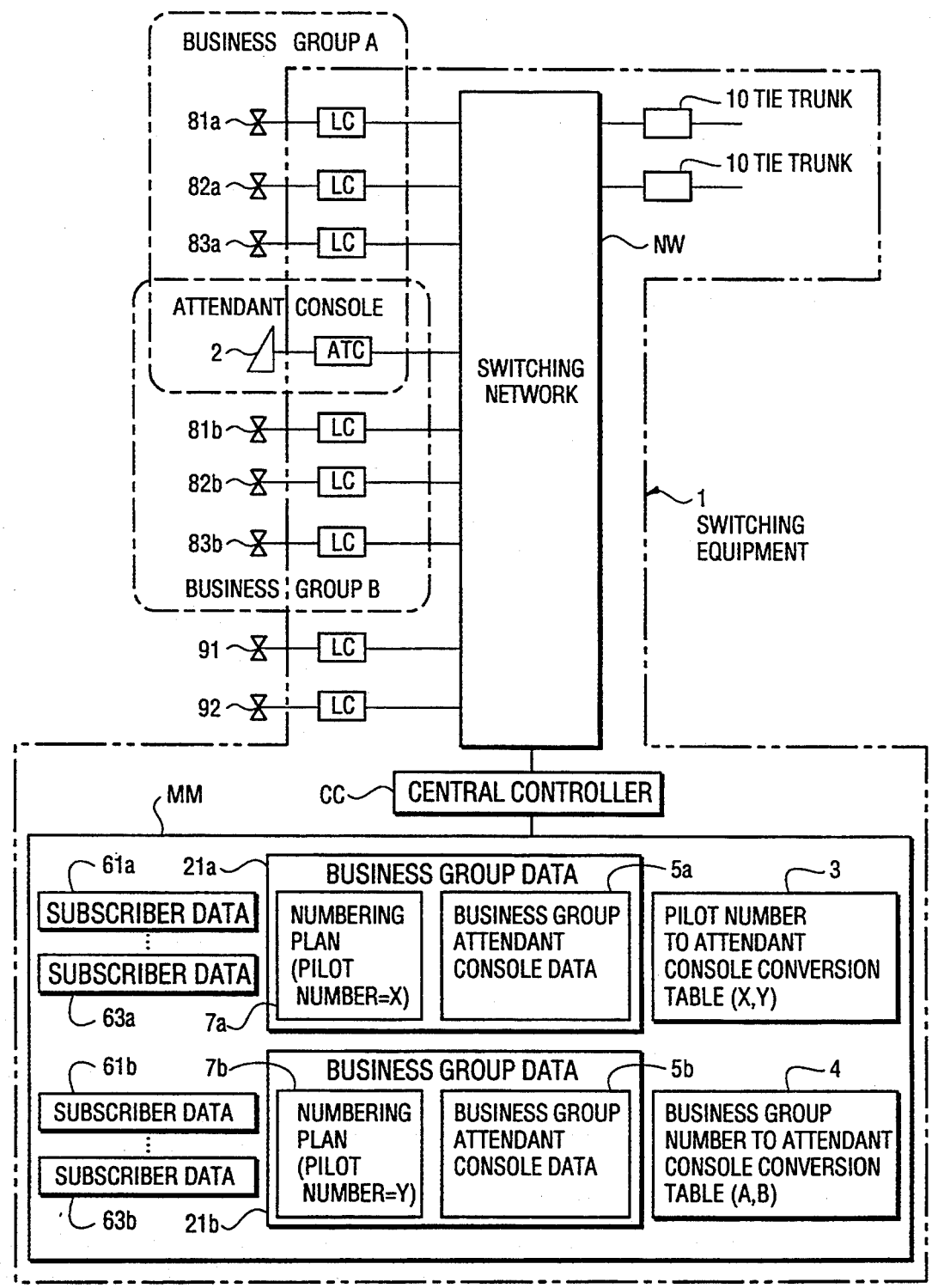
FIG. 2 is a block diagram of a centrex with an embodiment of the attendant console sharing system according to the present invention.

FIG. 2 is a block diagram of an embodiment of a centrex with the attendant console sharing system according to the present invention.

The centrex with the attendant console sharing system according to the present invention shown in FIG. 2 includes switching equipment 1 in which a number of business group extension line stations 81a to 83a and 81b to 83b which belong to a plurality of business groups A and B, respectively, a number of public network subscribers 91 and 92 and a number of tie trunks 10 are accommodated, and in which attendant console 2 is also connected to switching equipment 1. Switching equipment 1 includes switching network NW, main memory MM which includes subscriber data 61a to 63a and 61b to 63b which are to be linked to extension line stations belonging to business groups A and B, respectively, and business group data 21a and 21b indicating connection attributes of the business groups which are linked from all of the subscriber data for individual business groups A and B, respectively, and central controller CC including controlling means for sharing attendant console 2 with business groups A and B to perform centrex service.

Here, the present invention is characterized in that main memory MM includes business group attendant console data 5a and 5b holding data regarding each of the connection attributes of the attendant console for business groups A and B for the cases wherein attendant console 2 acts as belonging to business group A or B, pilot number-to-attendant console conversion table 3 for detecting business group attendant console data 5a or 5b in response to the pilot number of business group A or B, and business group number-to-attendant console conversion table 4 for detecting business group attendant console data 5a or 5b in response to the group number of either business group A or B, and the controlling means includes means for connecting for linking, upon receiving a call to attendant console 2, attendant console 2 to the attendant console data of the business group for which the call is destined.

Further, the means for connecting includes means for linking, in response to a call arriving from a public network subscriber through the pilot number of business group A or B, attendant console 2 to the attendant console data corresponding to the business group for which the call is destined, and means for linking, in response to a call received at attendant console 2 from an extension line station of business group A or B dialing attendant console access code, attendant console 2 to the attendant console data corresponding to the business group for which the call is destined in accordance with the content of business group number-to-attendant console conversion table 4.

Operation of the attendant console sharing system according to the present invention is described.

Figure 3:
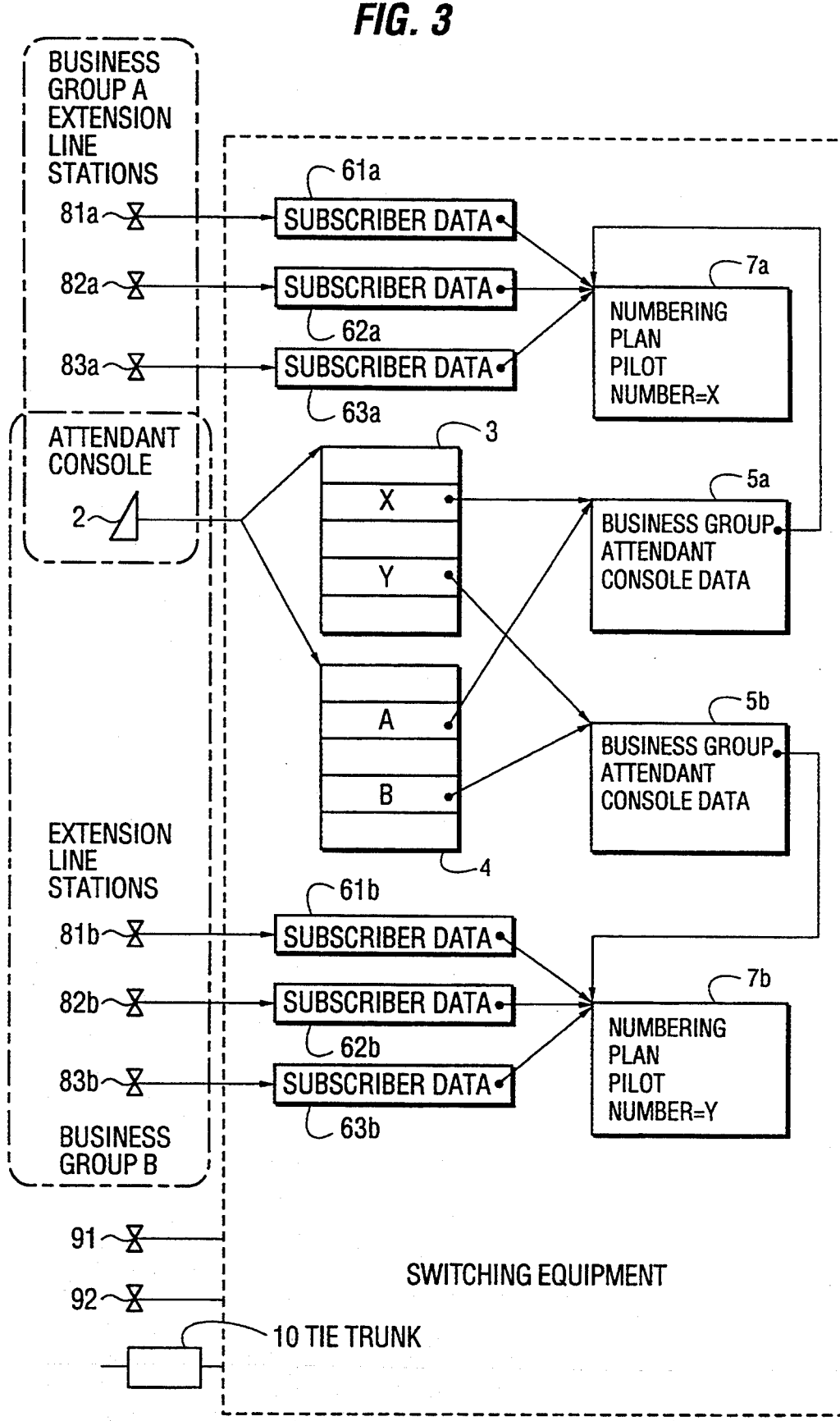
FIG. 3 is a diagrammatic view showing an example of the arrangement of data in the centrex with the attendant console sharing system shown in FIG. 2.
Figure 4:
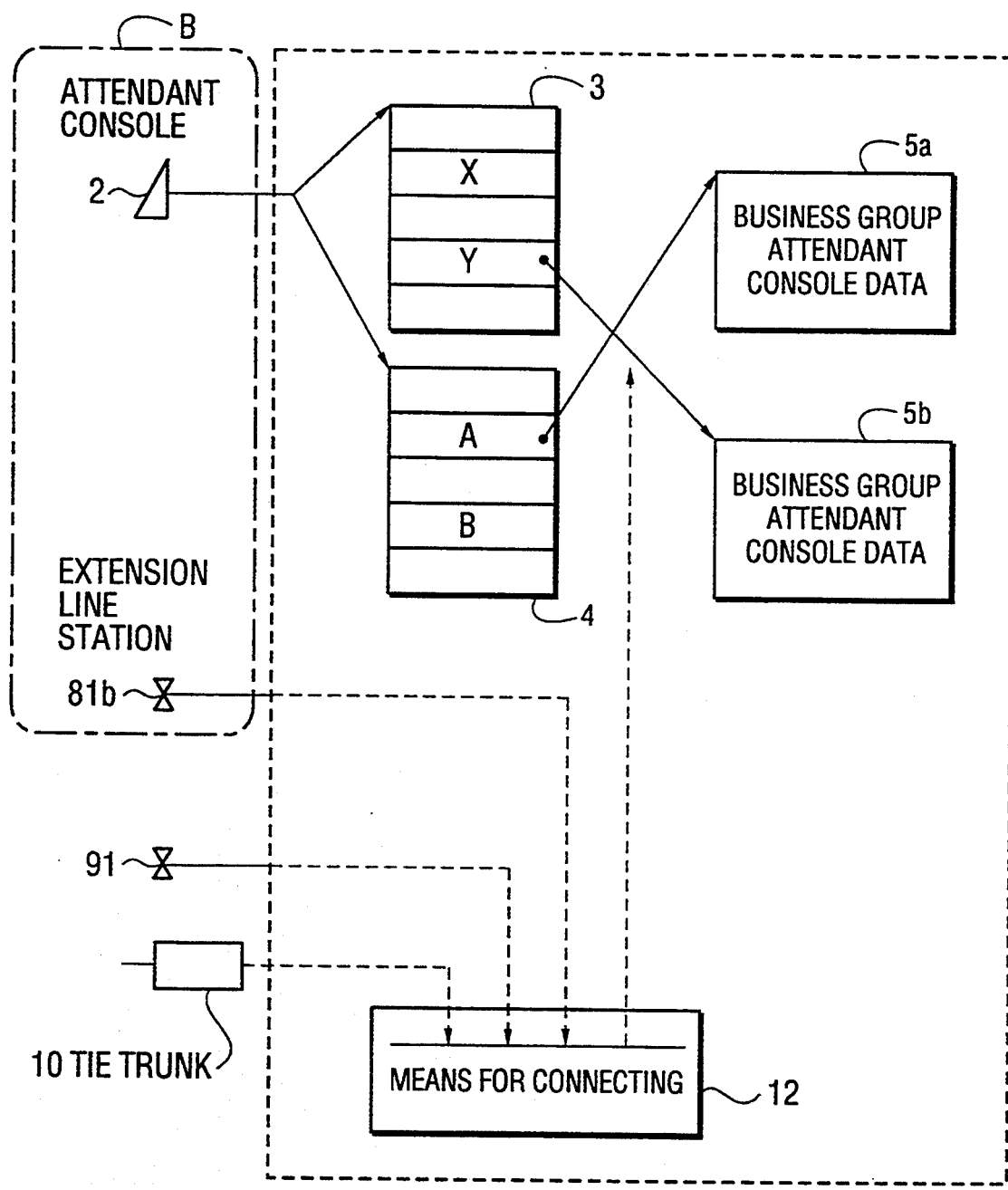
FIG. 4 is a diagrammatic view showing an example of the means for connecting of the centrex with the attendant console sharing system shown in FIG. 2.
Figure 5:
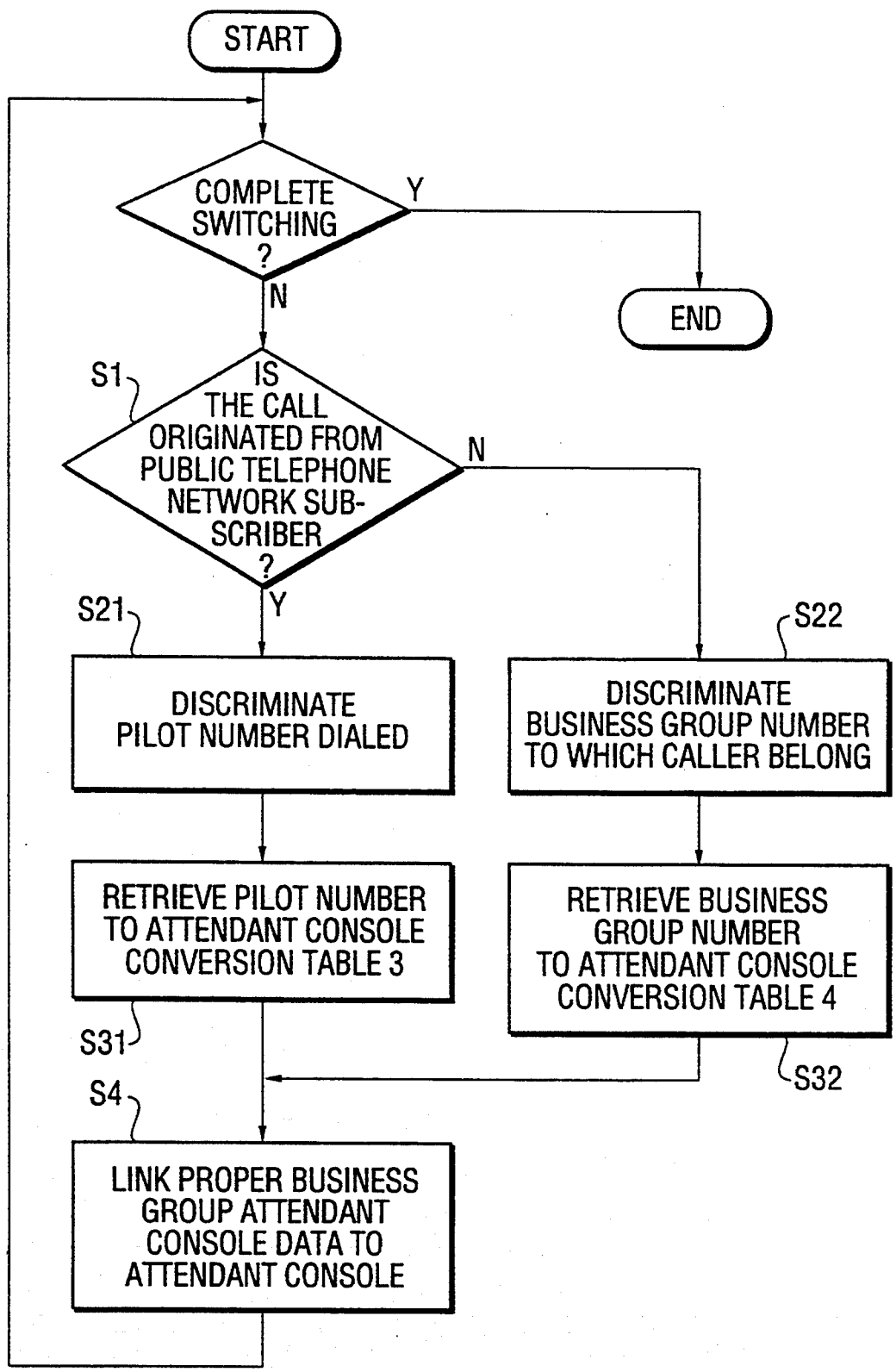
FIG. 5 is a flow chart illustrating operation of the means for connecting of the centrex with the attendant console sharing system shown in FIG. 4.
Figure 6:
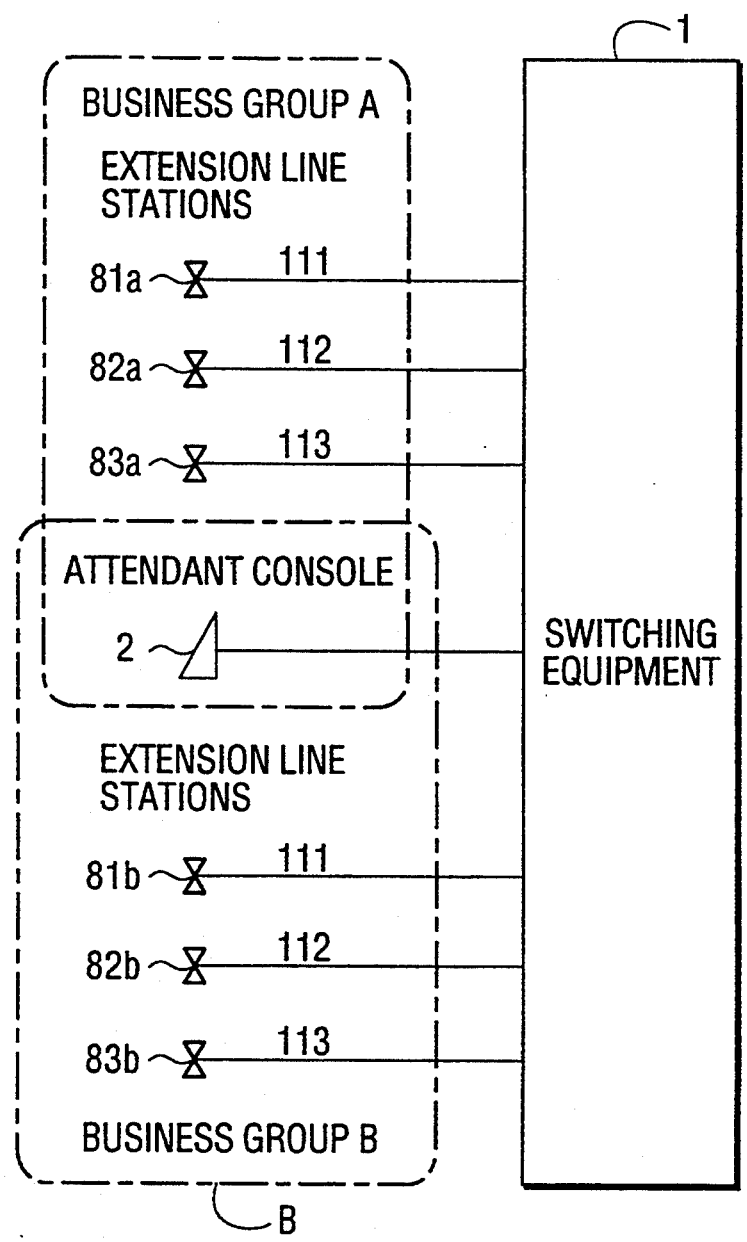
FIG. 6 is a diagrammatic view showing an embodiment of the extension line numbering plan of the centrex with the attendant console sharing system shown in FIG. 2.
Figure 7:
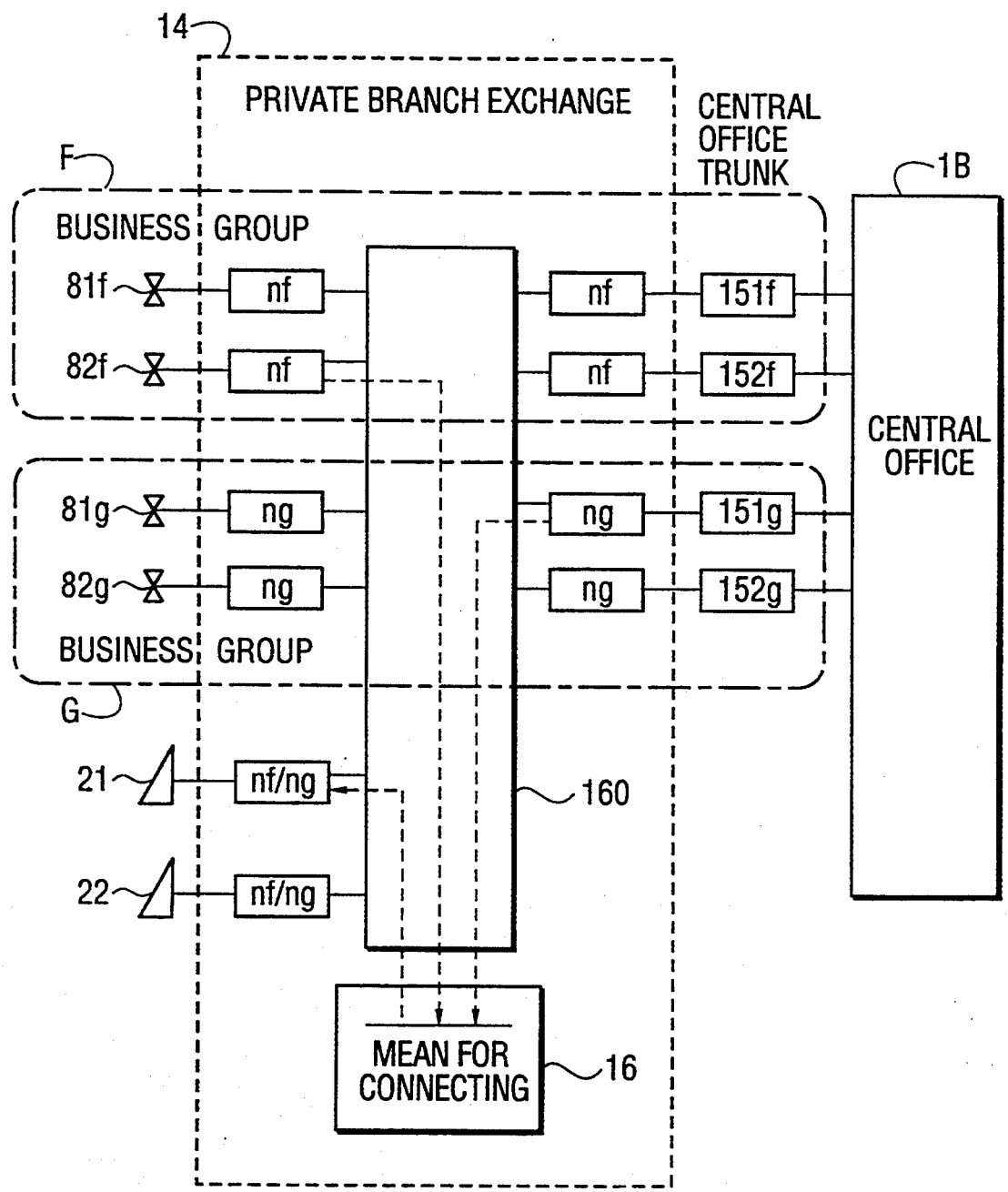
FIG. 7 is a diagrammatic view showing a second conventional system of a private branch exchange with the conventional attendant console sharing system.

FIG. 3 is a diagrammatic view showing an example of the arrangement of data in the centrex with the attendant console sharing system shown in FIG. 2; FIG. 4 is a diagrammatic view showing an example of the means for connecting of the centrex with the attendant console sharing system shown in FIG. 2; FIG. 5 is a flow chart illustrating operation of the means for connecting of the centrex with the attendant console sharing system shown in FIG. 4; and FIG. 6 is a diagrammatic view showing an example of the extension line numbering plan of the centrex with the attendant console sharing system shown in FIG. 2.

Referring to FIG. 3, reviewing the data arrangement regarding the business groups in the centrex, business group subscribers 81a, 82a and 83a of business group A are linked to subscriber data 61a, 62a, and 63a, respectively, and subscriber data 61a, 62a and 63a are linked to business group data 21a (FIG. 2) for business group A. Business group data 21a, 21b (FIG. 2) comprise numbering plan lists 7a, 7b, and business group attendant console data 5a, 5b, respectively. Numbering plan list 7a included in business group data 21a is utilized for number translation upon call connection from/to extension lines in business group A. This similarly applies to business group B.

When business groups A and B share attendant console 2, business group attendant console data 5a and business group attendant console data 5b are prepared to be linked to attendant console 2. The linking of attendant console 2 to attendant console data 5a and 5b is based on pilot number-to-attendant console conversion table 3 and business group number-to-attendant console conversion table 4.

Pilot number-to-attendant console conversion table 3 is constructed to determine, using a dialed pilot number as a key, an address pointer to the right business group attendant console data 5a or 5b according to the key.

Separately, business group number-to-attendant console conversion table 4 is constructed to determine, using a business group number as a key, an address pointer to the right attendant console data according to the key.

The procedure of establishing a link between attendant console 2 and business group attendant console data 5a or business group attendant console data 5b using pilot number-to-attendant console conversion table 3 and business group number-to-attendant console conversion table 4 is described with reference to FIGS. 4 and 5.

When a public telephone network subscriber dials a pilot number "y" of business group B and the call arrives at attendant console 2, the means for connecting 12 discriminates whether the incoming call is from a public telephone network subscriber 91, 92 or a call through tie trunk 10 (S1 to S21). Discriminating that the incoming call has a pilot number "y" pilot number-to-attendant console conversion table 3 is retrieved using pilot number "y" as a key (S31), and attendant console 2 is linked to business group attendant console subscriber data 5b in accordance with the result of the retrieval (S4).

Separately, when extension line station 81b of business group B dials an access code for accessing the attendant console and the call arrives at attendant console 2, means for connecting 12 discriminates the business group number "B" to which extension line station 81b belongs (S1 to S22). Then, business group number-to-attendant console conversion table 4 is retrieved using business group number "B" as a key (S32), and attendant console 2 is linked to business group attendant console data 5b (S4).

Referring to FIG. 3, after attendant console 2 is linked to business group attendant console data 5b, in order to translate an extension line number to be dialed from the attendant console, numbering plan list 7b is linked to attendant console 2, so, that the call is controlled so as to arrive at one of extension line stations of business group B, 81b to 83b, only within business group B even if an identical extension line number is present in both business groups A and B which share attendant console 2 as seen in FIG. 6.

It is to be noted that FIGS. 2 to 6 merely show an embodiment of the present invention. For example, attendant console 2 is not limited to be shared only by business groups A and B. Further, the attendant console to be shared is not limited only to attendant console 2; still further, a call arriving at the attendant console is not limited to come only from one of public network subscribers 91 and 92 or through tie trunks from a central exchange. The present invention exhibits a similar effect irrespective of the number of business groups which share the attendant console, the number of attendant consoles to be shared or the type of call-originaters. Further, the centrex system to which the present invention is not limited to that shown in the drawings.

As described to this point, the present invention is advantageous in that there is no restriction in the extension line numbering plan for business groups which share an attendant console and the attendant console can accept any call destined for any of the business groups which share the attendant console, and in that a call can be connected to an extension line station only within the business group for which the call is destined. Accordingly, security among different business groups is improved.

What is claimed is:

1. An attendant console sharing system in a centrex which comprises switching equipment connected to a plurality of extension line stations which belong to a plurality of business groups other than a plurality of subscriber lines and tie trunks of a public telephone network, said switching equipment including main memory means for storing subscriber data for said extension line stations belonging to each of said business groups and business group data holding connection attributes and numbering plans of each of said business groups, an attendant console connected to said switching equipment and a central controller including controlling means for sharing said attendant console among said business groups to perform a centrex service, said switching equipment comprising:

business group attendant console data including a connection attribute peculiar to each attendant console operation provided within the business group data for each of the business groups;

means for selecting, in response to an incoming call through one of a plurality of pilot numbers to said attendant console, the business group for which the incoming call is destined and for linking the business group attendant console data of the selected business group to said attendant console; and means for selecting, in response to an access call to said attendant console initiated by dialing an access code from an extension line, the business group in which the extension line station is accommodated and for linking the business group attendant console data of the selected business group to said attendant console.

2. An attendant console sharing system in a centrex which comprises switching equipment connected to a plurality of extension line stations which belong to a plurality of business groups other than a plurality of subscriber lines and tie trunks of a public telephone network, said switching equipment including main memory means for storing subscriber data for said extension line stations belonging to each of the business groups and business group data indicating connection attributes and numbering plans of each of the business groups, an attendant console connected to said switching equipment and a central controller including controlling means for sharing said attendant console among said business groups to perform a centrex service, said main memory means comprising:

business group attendant console data including a connection attribute peculiar to each attendant console operation stored in said main memory within the business group data for each of the business groups;

a pilot number-to-attendant console conversion table in which pilot numbers of the business groups and address pointers to the business group attendant console data are stored in a corresponding relationship; and a business group number-to-attendant console conversion table in which group numbers applied to the business groups and address pointers to the business group attendant console data are stored in a corresponding relationship, wherein said controlling means includes means for connecting, when an incoming call to said attendant console is received, said attendant console exclusively to the attendant console data for a business group which corresponds to the incoming call.

3. The attendant console sharing system as claimed in claim 2, wherein said means for connecting further includes:

means for linking, in response to an incoming call to one of the pilot numbers of the business groups from a subscriber of said public telephone network, said attendant console to the attendant console data exclusively corresponding to the business group for which the call is destined in accordance with the content of said pilot number-to-attendant console conversion table; and means for linking, in response to an incoming call to said attendant console originated by dialing an attendant console access code from one of the extension line stations in the business groups, said attendant console to the attendant console data exclusively corresponding to the business group for which the one extension line station belongs in accordance with the content of said business group number-to-attendant console conversion table.

4. A method of sharing an attendant console in a system including a plurality of extension line stations having associated extension numbers and being divided into a plurality of groups, each of the groups having a corresponding pilot number, the method comprising the steps of:

storing in a memory corresponding group data for each of the groups including connection attributes and number plans, each of the group data exclusively corresponding to one of the groups;

receiving an incoming call by the attendant console;

determining whether the incoming call is a first type of call which arrives from a public telephone network corresponding to one of the pilot numbers or a second type of call initiated by dialing an access code from one of the extension line stations; and when the incoming call is the first type, identifying a group which corresponds to the pilot number of the incoming call and exclusively linking the attendant console to group data corresponding to the identified group, and when the incoming call is the second type, exclusively linking the attendant console to group data corresponding to the group to which the extension line station from which the access code is dialed belongs, wherein the exclusive linking of the attendant console to the corresponding group data isolates the incoming call from group data of other groups and prevents the incoming call from being connected to extension line stations in the other groups.

5. A method of sharing an attendant console in a system including a plurality of extension line stations having associated extension numbers and being divided into a plurality of groups, each of the groups having a corresponding pilot number, the method comprising the steps of:

storing in a memory corresponding group data for each of the groups including connection attributes and number plans, each of the group data exclusively corresponding to one of the groups;

receiving an incoming call by the attendant console;

determining whether the incoming call is a first type of call corresponding ton one of the pilot numbers or a second type of call initiated by dialing an access code from one of the extension line stations; and when the incoming call is the first type, identifying a group which corresponds to the pilot number of the incoming call and linking the attendant console to group data corresponding to the identified group, and when the incoming call is the second type, linking the attendant console to group data corresponding to the group to which the extension line station from which the access code is dialed belongs, wherein two or more extension line stations within mutually exclusive groups have a same extension number.

* * * * *